United States Patent [19]

Adams et al.

[11] Patent Number: 4,514,105
[45] Date of Patent: Apr. 30, 1985

[54] MOUNTING MEANS FOR TIMER-MOTOR ASSEMBLY

[75] Inventors: George W. Adams, Greenwood; C. Bruce Banter, Indianapolis, both of Ind.

[73] Assignee: Emhart Industries, Inc., Indianapolis, Ind.

[21] Appl. No.: 413,627

[22] Filed: Sep. 1, 1982

[51] Int. Cl.³ .......................... F16D 1/00; F16F 15/04; G05G 17/00; F16H 29/00
[52] U.S. Cl. ........................... 403/24; 403/337; 403/398; 403/405; 248/637; 248/674; 74/3.54; 74/421 A; 200/38 R
[58] Field of Search ............... 251/129, 141; 403/24, 403/335, 336, 337, 338, 405, 398; 200/38 R, 38 BA, 38 CA; 248/674, 637, 27.1; 74/3.54, 421 A; 368/278

[56] References Cited

U.S. PATENT DOCUMENTS

| | | |
|---|---|---|
| 2,499,270 | 2/1950 | Ellis .................................. 200/38 R |
| 2,588,137 | 3/1952 | Marvin ............................... 251/141 |
| 3,021,399 | 2/1962 | Bowman ........................... 200/38 R |
| 3,098,131 | 7/1963 | Gallagher et al. ................. 74/3.54 |
| 3,140,727 | 7/1964 | Cutler ............................... 251/141 |
| 3,269,689 | 8/1966 | Lee .................................... 251/129 |
| 3,366,752 | 1/1968 | Smuka ............................. 200/38 R |
| 3,553,720 | 1/1971 | Brown ................................ 200/38 |
| 3,578,923 | 5/1971 | Morey et al. .................... 200/38 R |
| 3,581,028 | 5/1971 | Valbona ........................... 200/38 R |
| 3,999,442 | 12/1976 | Decker et al. ................. 403/335 X |
| 4,166,206 | 8/1979 | Deane et al. .................... 200/38 R |
| 4,302,639 | 11/1981 | Lewis et al. ............... 200/38 BA X |
| 4,319,101 | 3/1982 | Bolin ................................ 200/38 R |
| 4,339,109 | 7/1982 | Kawata et al. ................... 251/141 |

FOREIGN PATENT DOCUMENTS

| | | |
|---|---|---|
| 521921 | 2/1956 | Canada ............................. 251/141 |
| 2315853 | 10/1973 | Fed. Rep. of Germany ...... 251/129 |
| 1245958 | 10/1960 | France ............................. 200/38 R |

Primary Examiner—Cornelius J. Husar
Assistant Examiner—Todd G. Williams
Attorney, Agent, or Firm—Robert F. Meyer

[57] ABSTRACT

A timer assembly is trapped against a motor and gear box assembly by a bracket. The bracket is U-shaped to cradle the timer assembly in the bracket. It includes ears with apertures therein that mate with apertures in ears extending from the motor assembly. Rivets extend through the apertures to connect the ears together.

1 Claim, 2 Drawing Figures

MOUNTING MEANS FOR TIMER-MOTOR ASSEMBLY

BACKGROUND OF THE INVENTION

Generally speaking, the present invention is directed to a timer-motor assembly which comprises a motor and gear box assembly, a timer assembly and holding means trapping the timer assembly against the motor assembly.

The present invention is directed to a timer-motor assembly and more particularly to such an assmebly wherein the timer is connected to or held against a motor assembly by trapping it against the motor assembly.

In U.S. Pat. No. 3,553,720 there is described a variable circuit timer which is very small and compact. The particular timer shown in the patent is particularly useful in applications sich as hair dryers and coffee makers where governmental and industrial regulations are sometimes difficult to comply with and still be cost effective. For example, in the timer of the above noted patent, it has been found difficult to connect and hold the timer to the motor assembly in an economical fashion and still meet the regulations for electrically grounding the assembly. As shown in the patent, one method of connecting the timer to the motor assembly is through elongated screws. Another method is to use elongated mounting posts. While these types of connections have been, for the most part, successful, they are not cost effective.

FEATURES OR OBJECTS OF THE INVENTION

It is, therefore, a feature of the present invention to provide a timer-motor assembly having a means for holding a timer assembly to a motor assembly. Another feature of the invention is to provide such an assmebly having a holding means which traps the timer assembly against the motor assembly. Another feature of the invention is to provide such an assembly wherein the holding means includes a bracket which holds the timer assembly against the motor assembly. These and other features of the invention will become apparent from the following description taken in conjunction with the accompanying drawings.

DETAILED DESCRIPTION OF THE INVENTION

Figure 1:
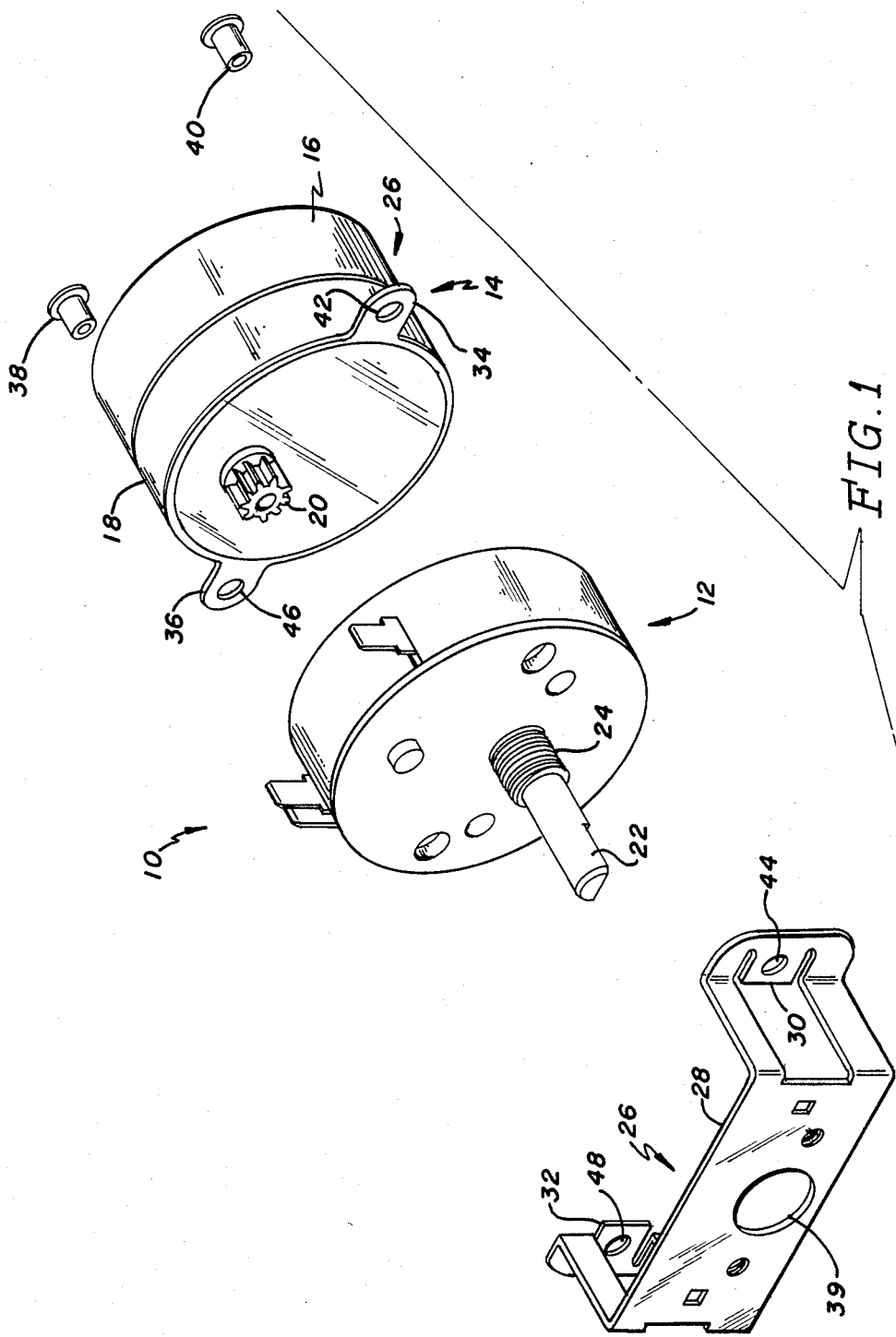
FIG. 1 is an exploded view of a timer-motor assembly employing the features of the invention.
Figure 2:
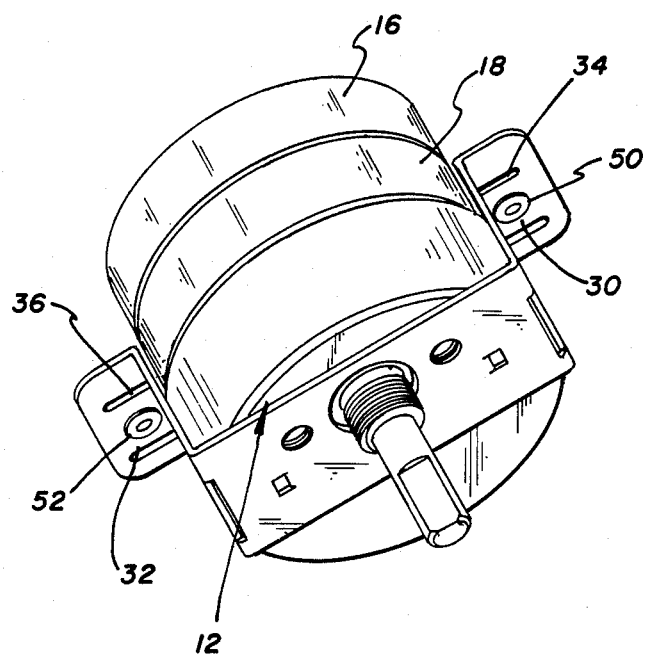
FIG. 2 is an isometric view of the assembly showing the timer and motor assemblies connected together.

Referring to the drawings, there is shown a timer-motor assembly 10 which includes a timer assembly 12 and a motor assembly 14 which includes a motor 16 and a gear box assembly 18. Timer assembly 12 and motor assembly 14 are of the type shown and described in the above noted U.S. Pat. No. 3,553,720. Since the details of the assemblies are not pertinent to the present invention they are not described in the interest of simplicity. Suffice it to say that motor assembly 14 includes a motor output pinion 20 which engages a gear held in timer assembly 12 to rotate a cam in the manner shown and described in the above referenced patent. Also, as shown and described in the above referenced patent, a shaft 22 permits manual setting of the cam of the timer. A bushing 24 provides a mounting means for the assembly onto a panel.

The present invention is concerned with a holding means 26 which traps the timer assembly 12 against the motor assembly 14. Holding means 26 includes U-shaped bracket 28 having ears 30 and 32 which mate with ears 34 and 36 of motor assembly 14. As shown, timer assembly 12 is cradled in the bracket. Shaft 22 extends through aperture 39 of the bracket. The bracket traps the timer assembly against the motor assembly and maintains the timer assembly in this position by eyelets 38 and 40 which extend through apertures 48–44 and 46–42 provided in their respective ears. The eyelets are headed 50–52 to provide rivets for holding the bracket in place.

What is claimed is:

1. A timer-motor assembly comprising:
   (a) A motor assembly,
   (b) A timer assembly, and
   (c) A bracket trapping said timer assembly between said motor assembly and said bracket, said bracket being U-shaped to cradle said timer assembly, said timer-motor assembly further comprising first ears extending from said bracket and having apertures therein, second ears extending from said motor assembly having apertures therein and mating said first ears, and rivet means extending through said apertures and connecting said first and second ears together.

* * * * *